April 24, 1956  C. S. STEADMAN  2,742,844
HEATING AND VENTILATING SYSTEMS FOR VEHICLES
Filed Nov. 17, 1951  2 Sheets-Sheet 1

C. S. STEADMAN
Inventor

By Thorne & Hall
Attorneys

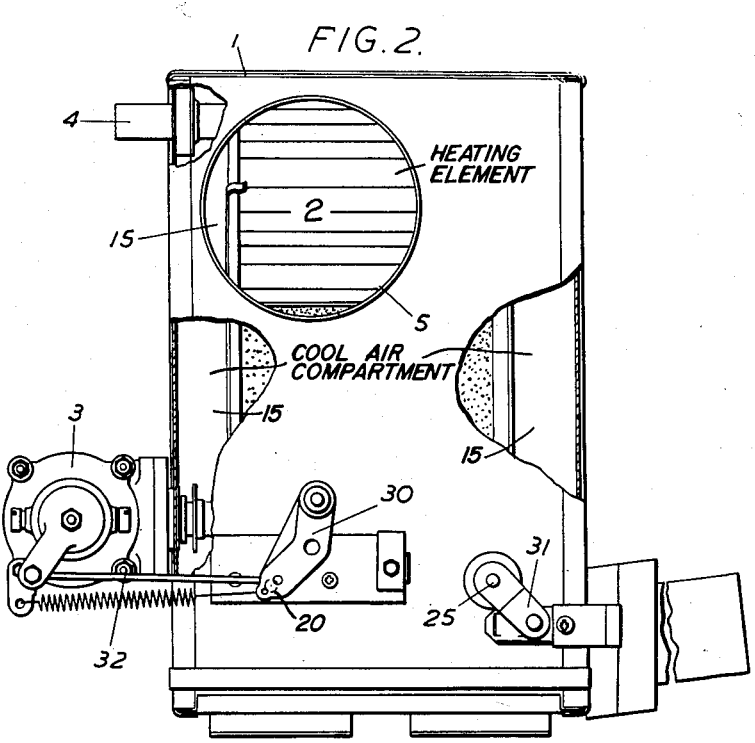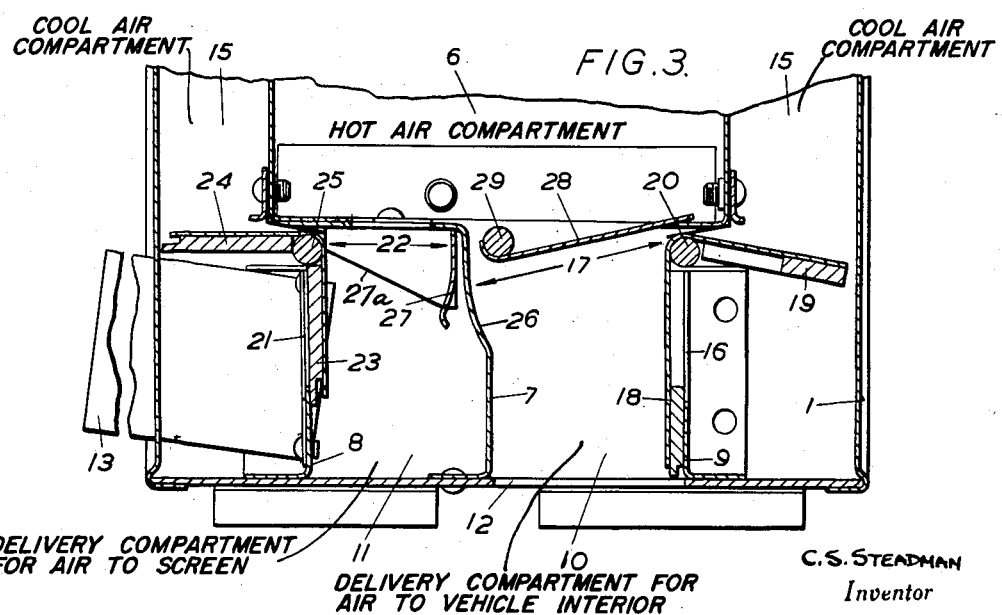

United States Patent Office 2,742,844
Patented Apr. 24, 1956

2,742,844

HEATING AND VENTILATING SYSTEMS FOR VEHICLES

Clifford S. Steadman, Cricklewood, London, England, assignor to S. Smith & Sons (England) Limited, London, England Application November 17, 1951, Serial No. 256,846

3 Claims. (Cl. 98—2)

This invention relates to heating and ventilating systems for vehicles particularly for motor vehicles. In such systems it is usual to provide for a supply of heating or cold air obtained from the exterior of the vehicle directly to the interior for ventilating and heating purposes and a further supply of heated or cold air to be directed on to the interior of the screen for demisting purposes. It is an object of the present invention to provide a heating and ventilating system for a vehicle in which the air supplied for either or both of the above purposes can be controlled, as to both temperature and volume, independently of that supplied for the other.

According to the present invention I provide in a heating and ventilating system for a vehicle first and second compartments adapted to be supplied respectively with heated and cool air, a valve chest whence air passes to the vehicle, a first port between the first compartment and the valve chest, a second port between the second compartment and the valve chest and first and second mechanically linked adjustable valve elements co-operating with the said ports, in a first extreme position of their range of adjustment serving to close both ports, in the other, second, extreme position serving to open fully the first port and close the second and in a range of intermediate positions to open partially both ports.

A heating and ventilating system for a motor vehicle embodying the features of the present invention will now be described with reference to the accompanying drawings of which:

Figure 2 shows an end elevation from the direction indicated by the arrows II—II in Figure 1.

Figure 3 shows a section along the line III—III in Figure 1.

Figure 1:
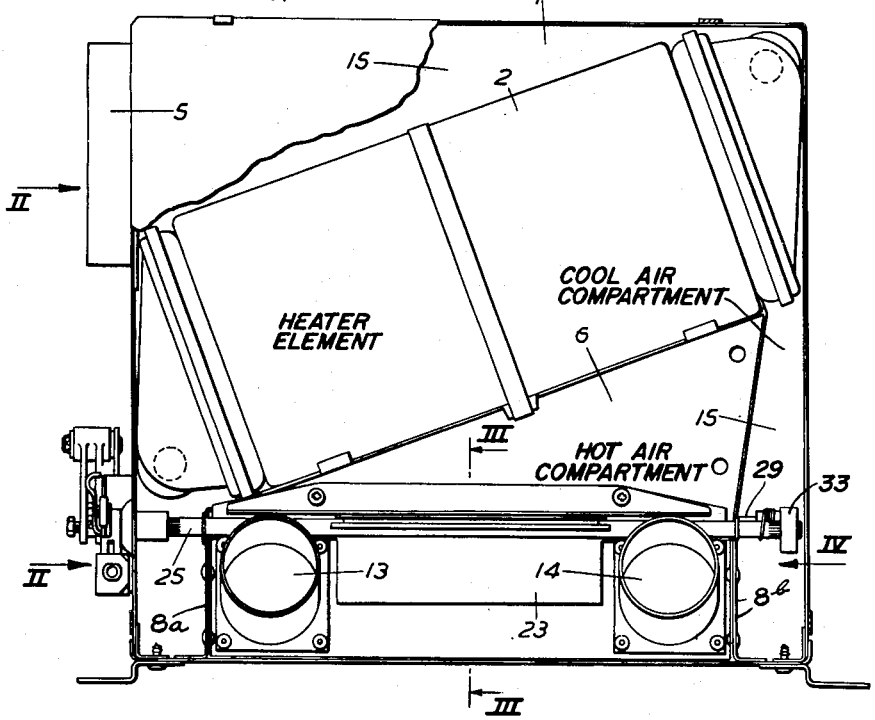
Figure 1 shows a side elevation partly in section.

The heater element and air-valves are contained in a rectangular sheet metal box-like housing 1. The heater element 2 is a conventional radiator structure adapted to be supplied with hot water from the normal engine cooling system through an inlet valve 3 and exit pipe 4. Air from the exterior of the vehicle is forced into the housing 1 through an opening 5 which is connected to the vehicle exterior through a duct (not shown) containing a fan driven by an electric motor (not shown). The heater element 2 is set cross-wise in the housing, as shown in Figure 1, is of such a size as to leave a gap between its vertical walls and those of the housing 1 (as shown in Figure 2); and on its lower side is attached to a hot air compartment 6, triangular in section and having its base parallel with that of the main housing. Compartment 6 is supported in spaced relationship from the base of housing 1 by sheet metal partitions 7, 8, 9, (running longitudinally of the housing) and 8a and 8b (at right angles to 7, 8, 9). Partitions 7, 8, 8a, 8b and part of the bases of housing 1 and compartment 6 thus enclose a generally box-like space 11, constituting one delivery compartment or valve chest, while partitions 7, 8a, 8b, 9 (again together with parts of the bases of housing 1 and compartment 6) enclose a further box-like space 10 constituting another delivery compartment or valve chest. Air flows from compartment 10 through opening 12 (formed in the appropriate part of the base of housing 1) directly to the interior of the vehicle, and from compartment 11 through stub pipes 13 and 14 carried in partition 8 and extending through the wall of housing 1. The stub pipes 13 and 14 communicate with ducts leading to the windscreen for demisting purposes. The space 15 bounded substantially by the top and vertical walls of housing 1, the exterior of heater element 2 and hot air compartment 6, and sheet metal partitions 8, 8a, 8b and 9 forms a cool air compartment, into which air from the exterior of the vehicle is forced through opening 5.

Valve chest 10 is provided with two ports 16 in the form of a rectangular opening in partition 9 connecting it with cool air compartment 15, and 17 in the form of a rectangular opening in the base of compartment 6 connecting it with the hot air compartment 6. Valve elements 18, 19 in the form of two rectangular flaps almost at right angles to each other and mounted upon a common shaft 20 cooperate with ports 16, 17 for the control of the proportions of hot and cool air fed to chest 10, as described below. A shroud 21 is provided by shaping partition 7 as shown at 26, and co-operates with valve element 18 to ensure that port 17 remains obstructed over the first part of the movement of valve element 18 from its horizontal position. An auxiliary valve 28 is provided mounted upon a shaft 29 and also co-operating with port 17. Valve chest 11 is provided with two ports 21, 22 communicating respectively with cool air compartment 15 and hot air compartment 6, these ports being in the form of rectangular openings respectively in partition 8 and the base of compartment 6. Valve elements 23, 24, in the form of two flaps at right angles to each other and mounted upon a common shaft 25 co-operate with ports 21, 22. A shroud 27 is provided in the neighborhood of port 22. Shroud 27 is formed from sheet metal attached to the base of compartment 6 on the side of port 22 away from shaft 25. Its main part has a section in the form of an arc of a circle centered about shaft 25 and engages with the side of flap 23 away from shaft 25. It is provided at its ends with portions such as 27a engaging with the sides of flap 23 at right angles to shaft 25. It thus cooperates with flap 23 to insure that port 22 is blocked over the first part of the movement of flap 23 from its horizontal position. All of the ports and flaps mentioned are in the form of elongated rectangles.

Figure 4:
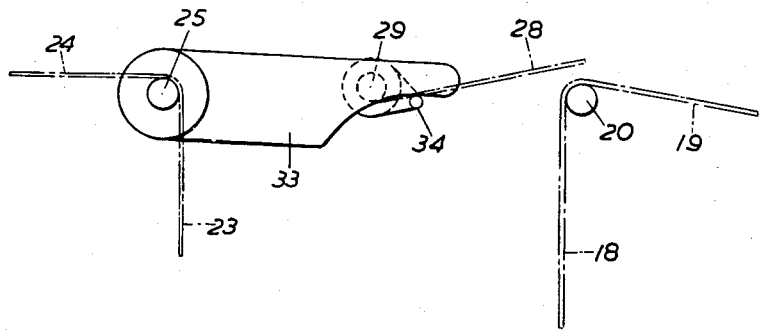
Figure 4 shows a detail of the operating mechanism from the direction of arrow IV in Figure 1.

The positions of shafts 20 and 25, and hence of their associated flaps, are controlled by means of the linkages, indicated at 30 and 31 respectively, controlled by suitable flexible cables (not shown), linkage 30 is also coupled to the water valve 3 as indicated at 32, which incorporates a lost motion connection, so that water valve 3 is closed by movement of the linkage past the position corresponding to an extreme position of shaft 20. Shaft 29 carrying auxiliary valve 28 is spring loaded, as indicated, and holds valve 28 normally in a position such as not to interfere appreciably with the flow of air through port 17 i. e. in a position approximately at right angles to that shown in Figures 3 and 4. As flaps 23 and 24 approach the position shown in Figure 3 arm 33 (Figure 4), which is rigidly attached to shaft 25, engages with projection 34 attached to shaft 29 and forces the flap 28 into the position shown against the action of the spring loading on shaft 29, partially obstructing the flow of air through port 17 into chest 10.

The system functions as follows:

Air drawn from the exterior of the vehicle is forced into compartment 15 and passes partially through heater element 2 to hot air compartment 6 and thence to chests 10 and 11 and partially directly to chests 10 and 11. In the "Off" condition flap 18 closes port 17, flap 19 closes port 16, flap 23 closes port 22 and flap 24 closes port 21. That is to say, all of the flaps 18, 19, 23, 24 and 28 are substantially at right angles to the positions shown in Figures 3 and 4. Thus in this condition no air passes out either through opening 12 or pipes 13 and 14.

As shaft 20 is turned counterclockwise port 16 is partially opened, while port 17 remains effectively closed by engagement of flap 18 with shroud 26. A flow of cold air from compartment 15 into the car interior is thus permitted. As the movement is continued hot air is permitted to flow into chest 10 and eventually, in the extreme position shown, all the air flowing directly to the car interior passes through port 17 after having passed through the heater element 2, port 16 being closed by flap 18. Upon movement of the linkage past the position corresponding to this condition valve 3 is closed by 32, cutting off the supply of hot water to heater element 2 by virtue of the lost motion connection referred to earlier. In this condition, cool air flows directly through to the car interior.

As shaft 25 is turned clockwise in a similar manner first of all a flow of cold air is permitted through pipes 13, 14 for demisting purposes, then an increasing flow of hot air is permitted, until in the position shown in Figure 3 all air passing to the screen has passed through port 22 having first passed through the heater element 2. As the position shown in Figure 3 is approached shaft 29 is rotated (as explained above) obstructing the flow of air through port 17 (and thence direct to the interior of the car) and producing an increased flow of hot air through pipes 13 and 14. This position is used when a maximum flow of hot air to the screen is required, for example for the removal of ice.

In the claims:

1. In a heating and ventilating device for a vehicle, a housing, air heating means within said housing, a hot air compartment within said housing arranged to receive air after passage through said air heating means, a cold air compartment within said housing, a first delivery compartment within said housing and adjacent said hot and cold air compartments, said first delivery compartment being bounded by portions of the walls of the housing and the hot and cold air compartments, said wall portions being provided with first, second and third apertures, said first aperture connecting the first delivery compartment and the hot air compartment, said second aperture connecting the first delivery compartment and the cold air compartment, and said third aperture connecting the first delivery compartment and the exterior of the housing, a first valve element within said first delivery compartment, said first valve element being selectively positionable between first and second extreme positions, whereby the said first valve element when in its said first and second extreme positions closes the said first and second apertures respectively, a second valve element within the said cold air compartment, said second valve element being selectively positionable between first and second extreme positions, whereby the said second valve element when in its first extreme position closes the second aperture and when in its said second extreme position the said second valve element is clear of the said second aperture thereby to offer no substantial resistance to air flow therethrough, a mechanical connection between said first and second valve elements such that they both assume their first extreme or second extreme positions simultaneously, and first shielding means positioned within the first delivery compartment adjacent said first valve to engage with said first valve over the initial part of its movement from its first extreme position thereby to prevent air flow through the first aperture, so that in the first extreme positions of the said first and second valves no flow of air through the first delivery compartment and the third aperture occurs, while as the said first and second valves are moved away from their said first extreme positions a flow of cool air, a mixture of cool and heated air and, in the said second extreme positions of said valves, heated air alone, successively occurs through the first delivery compartment and the third aperture.

2. The combination of claim 1, together with a second delivery compartment within said housing and adjacent the hot and cold compartments, said second delivery compartment being bounded by portions of the walls of the housing and the hot and cold air compartments, said wall portions being provided with fourth, fifth and sixth apertures, the said fourth aperture connecting the second delivery compartment and the hot air compartment, the said fifth aperture connecting the second delivery compartment and the cold air compartment, and the said sixth aperture connecting the second delivery compartment and the exterior of the housing, said fourth, fifth and sixth apertures corresponding to the said first, second and third apertures, third and fourth valve elements cooperating with the said fourth and fifth apertures corresponding to the first and second valve elements respectively, second shielding means in the second delivery compartment cooperating with the third valve corresponding to the first shielding means, air from the first delivery compartment being fed direct to the vehicle interior and air from the second delivery compartment being fed to the vehicle windshield for demisting purposes, means to adjust the first and second valve elements, independent means to adjust the third and fourth valve elements, a fifth adjustable valve element within the cold air compartment, positioned to cooperate with the first aperture, and means to actuate said fifth valve in accordance with the position of the third and fourth valves, said last-named means being so arranged that the fifth valve obstructs the first aperture only as the fourth and fifth valves approach their second extreme position, an increased flow of heated air to the vehicle windshield being thereby obtained.

3. The combination of claim 2 wherein the air heating means are arranged to be supplied with hot fluid, a fluid control valve to control the supply of hot fluid to the air heating means and means to control said fluid control valve, said last-named means being linked to the means for actuating the first and second valves.

References Cited in the file of this patent

UNITED STATES PATENTS

| 2,430,759 | Crise | Nov. 11, 1947 |
| 2,445,392 | Findley | July 20, 1948 |
| 2,488,278 | Findley | Nov. 15, 1949 |
| 2,492,506 | Stinnett | Dec. 27, 1949 |
| 2,495,883 | Aufiero | Jan. 31, 1950 |

FOREIGN PATENTS

| 229,012 | Great Britain | Feb. 19, 1925 |